United States Patent
Ahmed et al.

(10) Patent No.: US 11,300,659 B2
(45) Date of Patent: Apr. 12, 2022

(54) RADAR TARGET SIMULATOR AND METHOD FOR RADAR TARGET SIMULATION

(71) Applicant: Rohde & Schwarz GmbH & Co. KG, Munich (DE)

(72) Inventors: Sherif Ahmed, Starnberg (DE); Julian Adametz, Nuremberg (DE); Martin Vossiek, Furth (DE); Georg Körner, Schlusselfeld (DE); Christian Carlowitz, Nuremberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 322 days.

(21) Appl. No.: 16/433,696

(22) Filed: Jun. 6, 2019

(65) Prior Publication Data
US 2020/0110156 A1    Apr. 9, 2020

(30) Foreign Application Priority Data
Oct. 9, 2018 (DE) .................. 10 2018 124 816.4

(51) Int. Cl.
*G01S 7/40* (2006.01)
*G01S 7/35* (2006.01)

(52) U.S. Cl.
CPC ............ *G01S 7/4052* (2013.01); *G01S 7/352* (2013.01)

(58) Field of Classification Search
CPC ................................. G01S 7/4052; G01S 7/352
See application file for complete search history.

(56) References Cited

U.S. PATENT DOCUMENTS

| | | | |
|---|---|---|---|
| 3,713,081 A | 1/1973 | Murphree | |
| 3,792,475 A | 2/1974 | Smetana | |
| 4,450,447 A | 5/1984 | Zebker et al. | |
| 4,626,217 A * | 12/1986 | Tardif | G01S 7/52004 434/8 |
| 4,986,755 A | 1/1991 | Johnson | |
| 2009/0061759 A1 * | 3/2009 | Stoddard | H04K 3/41 455/1 |
| 2016/0329907 A1 * | 11/2016 | Miki | H03M 1/1061 |
| 2021/0018591 A1 * | 1/2021 | Gruber | G01S 7/4082 |

FOREIGN PATENT DOCUMENTS

| | | | | |
|---|---|---|---|---|
| JP | 2013016050 A | | 1/2013 | |
| KR | 20160050121 A | | 5/2016 | |
| KR | 2016/0050121 | * | 11/2016 | ............. G01S 13/04 |

OTHER PUBLICATIONS

Office Action for the related British Patent Application No. 1906518.4, dated Oct. 21, 2019, 3 pages.

* cited by examiner

*Primary Examiner* — Donald HB Braswell
(74) *Attorney, Agent, or Firm* — Ditthavong, Steiner & Mlotkowski (57) ABSTRACT

A radar target simulator for simulating radar targets is provided. The radar target simulator has an analogue-to-digital converter having a first clock generator and a digital-to-analogue converter having a second clock generator. The analogue-to-digital converter is configured to receive a radar signal transmitted by a radar system as an input signal, while the digital-to-analogue converter is configured to return an output signal to the radar system for simulation of the radar target. Further, the first and the second clock generator are configured to operate the analogue-to-digital converter and the digital-to-analogue converter at a different sampling rate in each case.

11 Claims, 11 Drawing Sheets

RADAR TARGET SIMULATOR AND METHOD FOR RADAR TARGET SIMULATION

PRIORITY

This application claims priority of German Patent Application No. 10 2018 124 816.4 filed on Oct. 9, 2018, which is incorporated by reference herewith.

FIELD OF THE INVENTION

The invention relates to a radar target simulator and a method for radar target simulation that are suitable in particular for simulating a radar target, preferably a moving radar target.

BACKGROUND OF THE INVENTION

A rising number of autonomous vehicles and the associated need to provide reliable automobile radars mean that the demand for appropriate radar target simulators and methods for radar target simulation that can be used to test the correct functionality of such automobile radars is growing.

The document U.S. Pat. No. 3,792,475 shows a radar target simulator combined with an S, C and X band oscillator. Disadvantageously, its complexity means that this radar target simulator is not only sophisticated and expensive to produce but also leads to inexact radar target simulations on account of an accordingly large number of error sources.

Accordingly, there is a need to provide a radar target simulator and a method for radar target simulation, wherein not only is it possible for applicable radar targets to be simulated particularly exactly, it is also possible to produce such a radar target simulator and such a radar target simulation method particularly easily and cost efficiently.

SUMMARY OF THE INVENTION

According to a first aspect of the invention, a radar target simulator for simulating radar targets is provided. The radar target simulator has an analogue-to-digital converter having a first clock generator and a digital-to-analogue converter having a second clock generator. The analogue-to-digital converter is configured to receive a radar signal transmitted by a radar system as an input signal, while the digital-to-analogue converter is configured to return an output signal to the radar system for simulation of a radar target. Further, the first and the second clock generator are configured to operate the analogue-to-digital converter and the digital-to-analogue converter at a different sampling rate in each case.

Advantageously, the different sampling rates allow in particular the distance between the applicable radar targets to be continuously altered. This prevents the radar targets from "jumping". The radar echoes produced by the radar target simulator are therefore modelled very realistically. Further, it is also possible for the speed and acceleration to be simulated in continuous values by means of appropriate customization of the output-side sampling rate. In this case, a high level of plausibility for the signal can be ensured, since both the temporal duration of the signal and the frequency offset can be consistently modelled. On account of its comparatively low complexity, the radar target simulator according to the invention is additionally particularly cost-efficient to produce.

According to a first preferred embodiment of the first aspect of the invention, the radar target simulator has a memory, wherein applicable samples of the analogue-to-digital converter relating to the input signal are written to the memory at a write speed that differs from the read speed at which applicable values of the digital-to-analogue converter relating to the formation of the output signal are read from the memory.

According to a second preferred embodiment of the first aspect of the invention, the radar target simulator has at least one further digital-to-analogue converter in order to provide at least two output channels. Additionally or alternatively, the radar target simulator has at least one further analogue-to-digital converter in order to provide at least two input channels. Advantageously, it is thus possible for multiple radar targets to be simulated in a cost-efficient manner.

According to a further preferred embodiment of the first aspect of the invention, for the relationship between the sampling rate of the digital-to-analogue converter $f_{CLKn}$, where n=1, and the sampling rate of the analogue-to-digital converter $f_{CLK\,I}$, or, when there are multiple output channels, for the relationship between the sampling rate of the applicable digital-to-analogue converter $f_{CLKn}$, where n=1, 2, 3, ..., in the respective output channel and the sampling rate of the analogue-to-digital converter $f_{CLK\,I}$, the following formula holds:

$$f_{CLKn} = f_{CLK\,I} \cdot \frac{1}{1 + \frac{2 \cdot v_{obj\,n}}{c_0}},$$

where $v_{obj\,n}$ is the speed of the accordingly simulated radar target using the one or the respective output channel relative to the radar system, and where $c_0$ is the propagation speed of the applicable electromagnetic wave in open space. Advantageously, observance of this relationship not only increases the exactness of the applicable simulation, but also reduces the complexity thereof, which leads to low production costs.

According to a further preferred embodiment of the first aspect of the invention, the radar target simulator is configured to process the input signal on the applicable carrier signal frequency.

According to a further preferred embodiment of the first aspect of the invention, the radar target simulator is configured to process the input signal on an intermediate frequency level. In this connection, the radar target simulator has an input-side mixer configured to mix the input signal with a first frequency before the conversion using the analogue-to-digital converter. Also, the radar target simulator has an output-side mixer, or, when there are multiple output channels, accordingly multiple output-side mixers, which are each configured to mix the output signal in each case with a second frequency, or, when there are multiple output channels, with an applicable second frequencies in the respective output channel, after the conversion using the applicable digital-to-analogue converter.

According to a further preferred embodiment of the first aspect of the invention, for the relationship between the first frequency $f_{LO\,I}$ and the second frequency $f_{LO\,n}$, wherein n=1, or, when there are multiple output channels, for the relationship between the first frequency $f_{LO\,I}$ and the applicable second frequency $f_{LO\,n}$, where n=1, 2, 3, ..., in the respective output channel, the following formula $$f_{LOn} = f_{LOl}\left(1 + \frac{2 \cdot v_{objn}}{c_0}\right),$$

where $v_{obj\ n}$ is the speed of the applicably simulated radar target using the one or the respective output channel relative to the radar system, and where $c_0$ is the propagation speed of the applicable electromagnetic wave in open space. Advantageously, observance of this relationship not only increases the exactness of the applicable simulation, but also reduces the complexity thereof, which leads to low production costs.

According to a further preferred embodiment of the first aspect of the invention, the radar target simulator is configured to simulate the radar target based on undersampling of the input signal. Advantageously, the complexity of the radar target simulator is thus reduced to a particularly great extent, which leads to corresponding lowering of the production costs.

According to a further preferred embodiment of the first aspect of the invention, the radar target simulator has an input-side mixer configured to mix the input signal with a local oscillator frequency before the conversion using the analogue-to-digital converter. Further, the radar target simulator in this context has an output-side mixer configured to mix the output signal with the local oscillator frequency, or, when there are multiple output channels, to mix each of these output channels with the local oscillator frequency, after the conversion using the digital-to-analogue converter. Additionally, the radar target simulator has an additional mixer, or, when there are multiple output channels, accordingly multiple additional mixers, which are each configured to mix the input signal with a mix frequency, or, when there are multiple output channels, with an applicable mix frequency in the respective output channel, after the conversion using the analogue-to-digital converter.

According to a further preferred embodiment of the first aspect of the invention, for the relationship between the local oscillator frequency $f_{LO}$ and the mix frequency $f_{Mix\ n}$, where n=1, or, when there are multiple output channels, for the relationship between the local oscillator frequency $f_{LO}$ and the applicable mix frequency $f_{Mix\ n}$, wherein n=1, 2, 3, . . . , in the respective output channel, the following formula holds:

$$f_{Mixn} = \frac{f_{LO}}{\left(1 + \frac{c_0}{2 \cdot v_{objn}}\right)} \approx f_{LO}\left(\frac{2 \cdot v_{objn}}{c_0}\right),$$

where $v_{obj\ n}$ is the speed of the accordingly simulated radar target using the one or the respective output channel relative to the radar system, and where $c_0$ is the propagation speed of the applicable electromagnetic wave in open space. Advantageously, observance of this relationship not only increases the exactness of the applicable simulation, but also produces the complexity thereof, which leads to low production costs.

According to a second aspect of the invention, a method for radar target simulation is provided, wherein the method has the following steps: receiving a radar signal transmitted by a radar system as an input signal using an analogue-to-digital converter, returning an output signal to the radar system for simulation of a radar target using a digital-to-analogue converter, and operating the analogue-to-digital converter and the digital-to-analogue converter at a different sampling rate in each case.

Further, all preferred embodiments of the first aspect of the invention apply to the second aspect of the invention in an analogous manner.

BRIEF DESCRIPTION OF THE DRAWINGS

A detailed exemplary description of some embodiments of the invention is provided below with reference to figures of the drawing by way of example only, in which.

DESCRIPTION OF PREFERRED EMBODIMENTS

Before the aforementioned fixtures are each discussed in detail below, it should be pointed out generally at this juncture that the radar target simulator according to the invention can be used in particular for testing and characterizing automobile radars. Using the radar target simulator, it is in particular possible to exactly model both the expansion and compression of the applicable signal over time for a moving target and the Doppler offset without having to resort to computationally intensive digital signal processing techniques. Preferably, particular target parameters, for example a distance $d_0$ or a Doppler frequency $f_D$, are taken as a basis for altering the sampling rates of the applicable digital-to-analogue converters (cf. formula (4) below), as a result of which it is possible for a moving target to be simulated.

Figure 1:
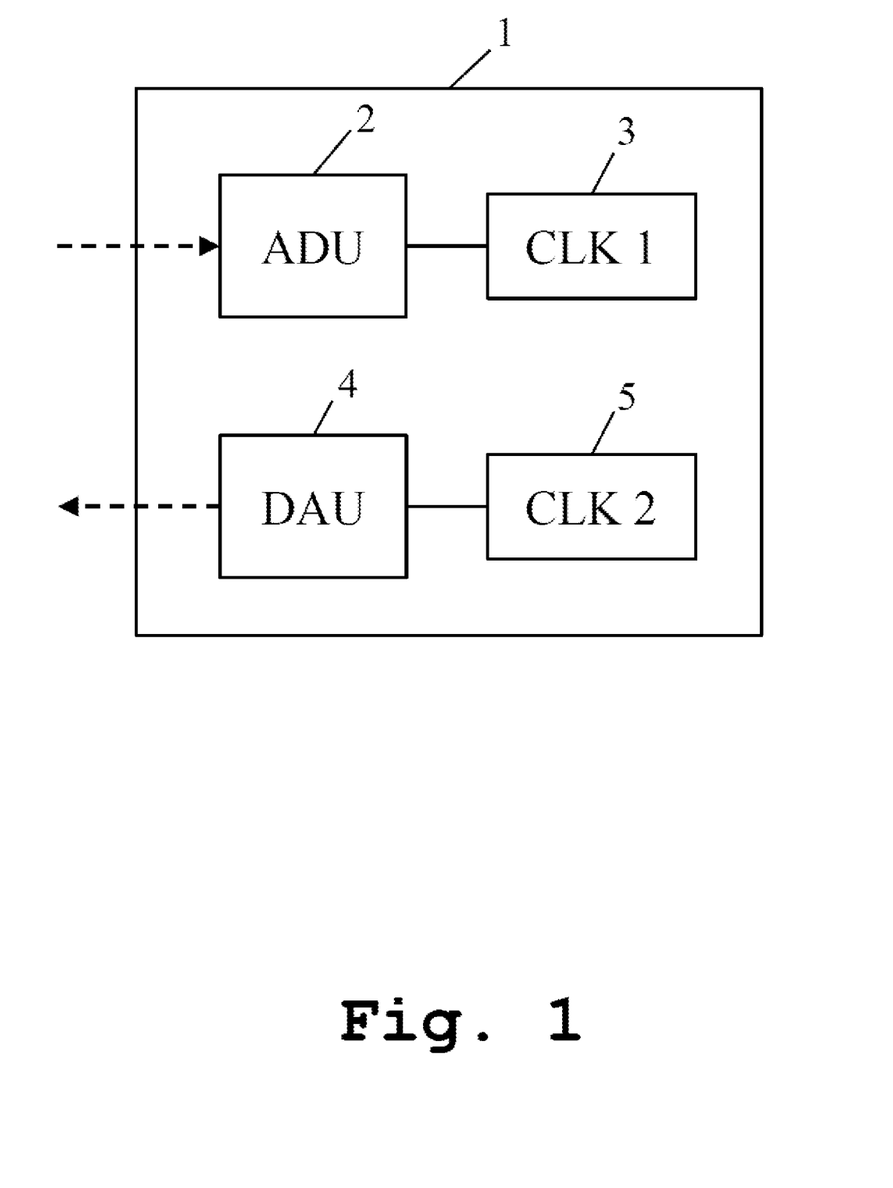
FIG. 1 shows a first exemplary embodiment of a radar target simulator according to the invention.

According to FIG. 1, the radar target simulator 1 of the first exemplary embodiment has an analogue-to-digital converter 2 having a first clock generator 3 and a digital-to-analogue converter 4 having a second clock generator 5.

In this case, the analogue-to-digital converter 2 is configured to receive a radar signal transmitted by a radar system and an input signal, while the digital-to-analogue converter 4 is configured to return an output signal to the radar system for simulation of a radar target. Also, the first and the second clock generator 3, 5 are configured to operate the analogue-to-digital converter 2 and the digital-to-analogue converter 4 at a different sampling rate in each case.

Figure 2:
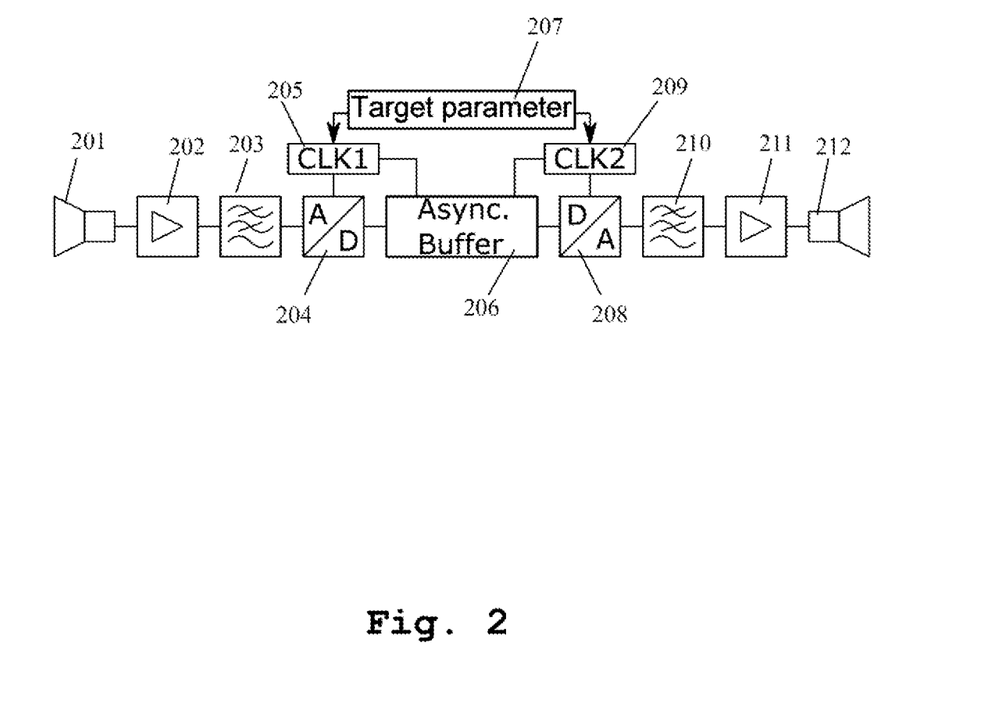
FIG. 2 shows a second exemplary embodiment of a radar target simulator according to the invention.

Further, FIG. 2 shows the second exemplary embodiment. This has a receive antenna, in particular a horn antenna 201, which is configured to receive the signal transmitted by the radar system as an input signal. The input signal obtained in this manner is subsequently amplified using an amplifier 202, filtered using a filter 203 and converted into a corresponding digital signal using an analogue-to-digital converter 204. The applicable timing for the analogue-to-digital conversion is determined by a first clock generator 205.

Furthermore, the second embodiment has a memory, preferably a buffer memory, particularly preferably an asynchronous buffer memory 206, wherein applicable samples of the analogue-to-digital converter 204 in relation to the input signal are written to the memory 206 at a write speed determined by the first clock generator 205.

Subsequently, these samples that are in the memory 206 are read from the memory 206 using a digital-to-analogue converter 208 and converted into a corresponding analogue signal. The applicable timing for the digital-to-analogue conversion is determined by a second clock generator 209.

Further, the read speed at which applicable values of the digital-to-analogue converter 208 relating to the formation of the output signal are read from the memory 206 is determined by the second clock generator 209. In this case, the aforementioned write speed is preferably different from the aforementioned read speed.

Before the output signal generated using the digital-to-analogue converter 208 is returned to the radar system using a transmit antenna, in particular a horn antenna 212, it is initially filtered using a filter 210 and amplified using an amplifier 211.

In general, it should be noted that the input signal is altered to produce a corresponding output signal such that different properties of a real radar target, in particular of a moving radar target, can be simulated. Such properties are for example the position of the radar target or the speed of movement of the radar target. According to FIG. 2, it can be seen that applicable target parameters 207 are transferred both to the first clock generator 205 and to the second clock generator 209.

In regard to the embodiments depicted below, it should also be mentioned that multiple channels are produced in particular by means of different outputs. In this case, in particular multiple digital-to-analogue converters are used in each case. Additionally, there is also the possibility of also using multiple analogue-to-digital converters instead of multiple digital-to-analogue converters and of producing the different channels for the different radar targets in this manner.

Figure 3:
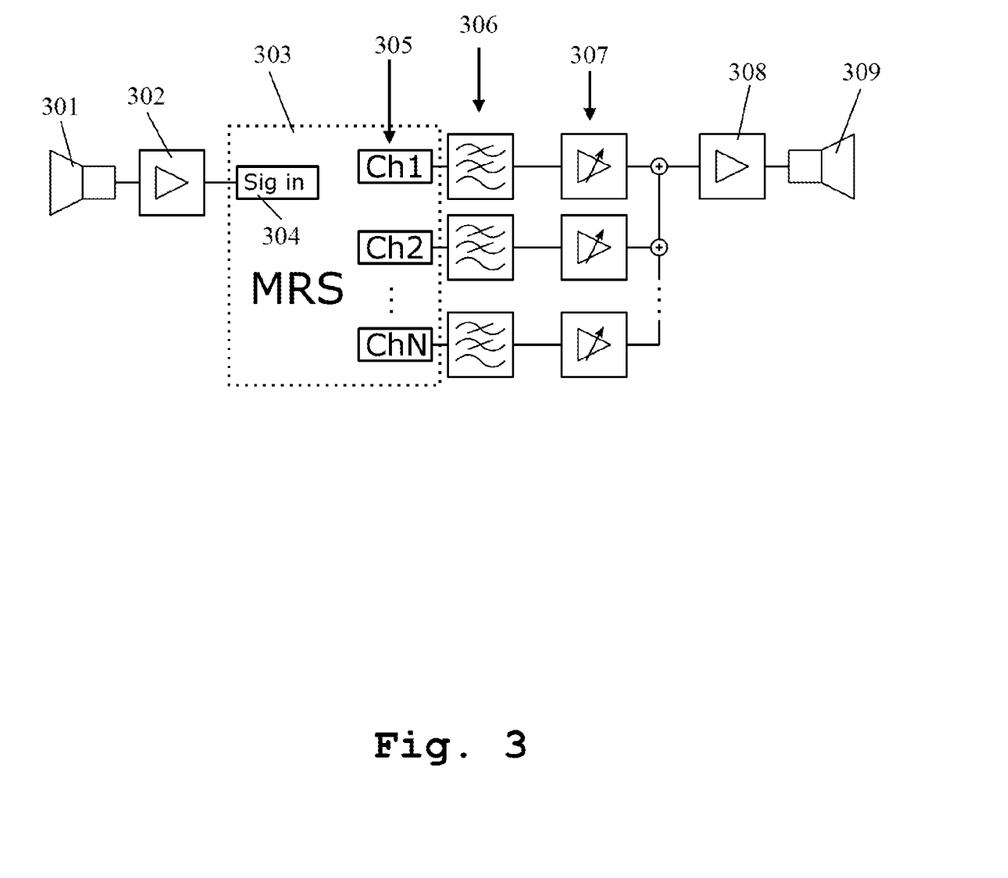
FIG. 3 shows a third exemplary embodiment of a radar target simulator according to the invention.

The third exemplary embodiment is illustrated by FIG. 3 and has a receive antenna 301 and an accordingly downstream amplifier 302. Further, this third embodiment has a multirate system 303 that comprises an input channel 304 and n output channels 305. The input channel 304 is provided with the output signal of the aforementioned amplifier 302.

Also, each of the n output channels 305 has a filter 306 and an amplifier, in particular an adjustable amplifier 307, in each case. In particular, the aggregate signal of all the n output channels 305 is amplified using an output-side amplifier 308 before it is finally returned to the radar system as appropriate using a transmit antenna 309.

Furthermore, within the context of the third embodiment, it should be noted that the signal transmitted by the radar is preferably processed at carrier signal frequency using the multirate system 303. Each of the filters 306 in the respective output channel of the n output channels 305 is preferably embodied as a reconstruction filter and in particular configured to interpolate the signal thus generated. Further, each output channel of the n output channels 305 is in particular capable of simulating an independent radar target.

Additionally, each of the adjustable or variable amplifiers 307, which are each in each of the n output channels 305, is preferably configured to set the backscatter cross section of the applicable radar target. In particular if there is sufficiently high computation power, applicable attenuation can also be performed in the digital domain.

Figure 4:
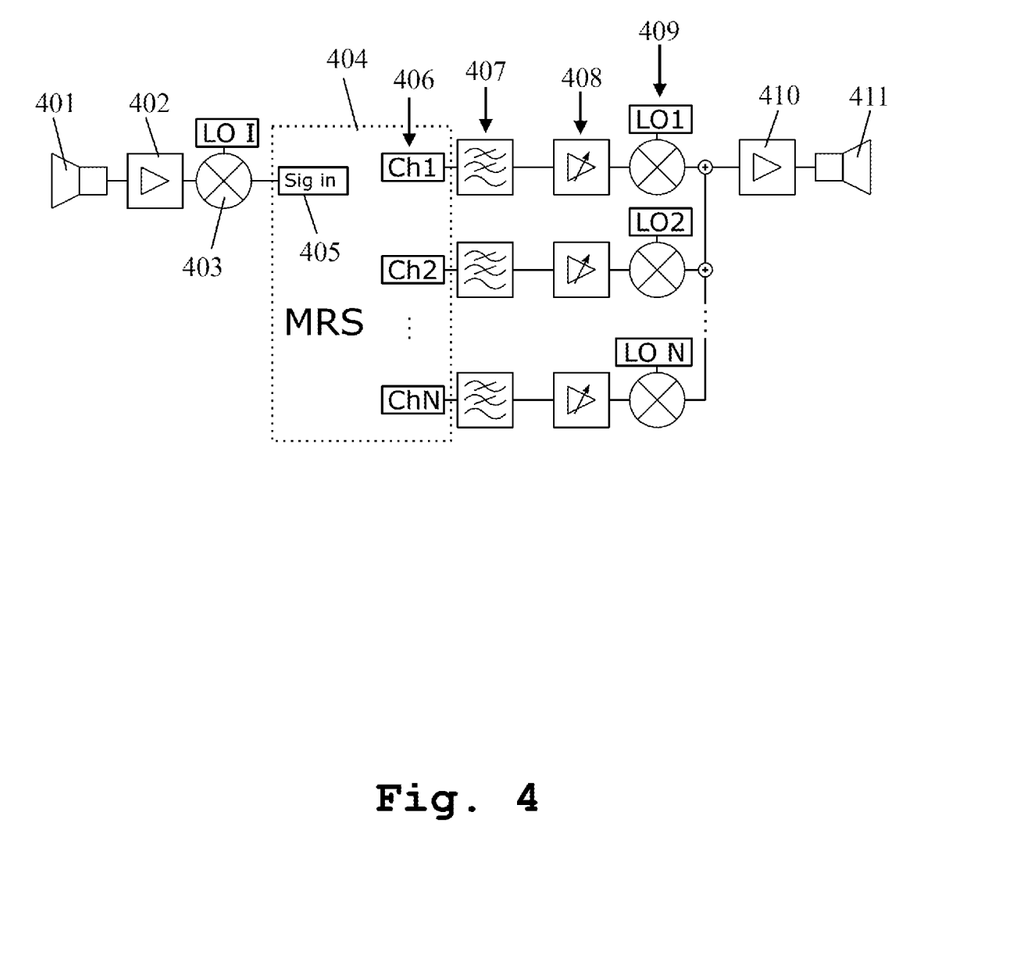
FIG. 4 shows a fourth exemplary embodiment of a radar target simulator according to the invention.

Within the context of the fourth exemplary embodiment according to FIG. 4, the applicable signal processing is effected on an intermediate frequency level. Thus, this fourth embodiment has not only the receive antenna 401 and the accordingly downstream amplifier 402 but additionally an input-side mixer 403, connected downstream of the amplifier 402, which is configured to mix the applicable signal with an input local oscillator frequency before it is supplied to a multirate system 404 comprising an input channel 405 and n output channels 406. The applicable mixing is preferably down-conversion.

Furthermore, each of the n output channels 406 has a filter 407, an adjustable amplifier 408 and an output-side mixer 409 in each case. Each of these n output-side mixers 409 is configured to mix the applicable signal with an applicable output local oscillator frequency in the respective output channel. In particular the aggregate signal of all n output channels 409 is subsequently amplified using an amplifier 410 and returned to the radar system by means of a transmit antenna 411.

Figure 5:
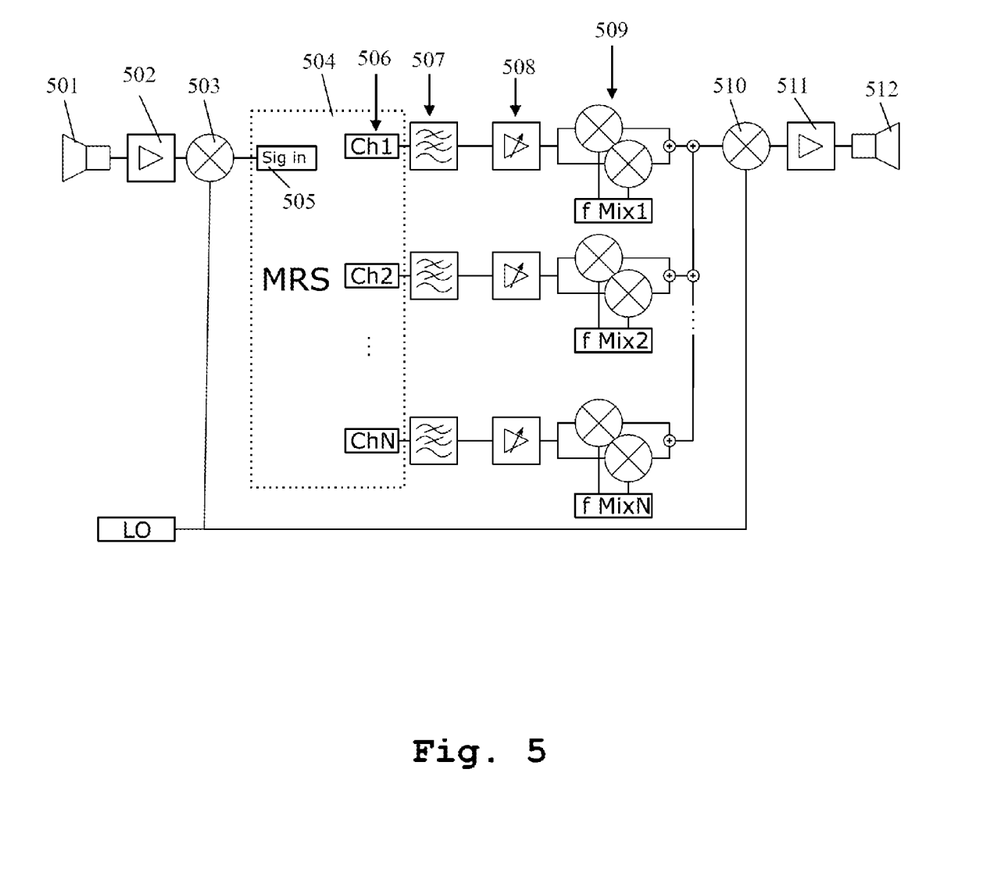
FIG. 5 shows a fifth exemplary embodiment of a radar target simulator according to the invention.

It should additionally be noted that, in particular when mixing onto the applicable carrier frequency, preferably an accordingly different frequency is used in order to model the correct Doppler offset. Furthermore, a two-stage conversion is likewise conceivable and is illustrated by FIG. 5. Also, the attenuation can take place in the digital domain.

The aforementioned output local oscillator frequency $f_{LO\ n}$ of the respective output channel of the n output channels 406 can be calculated on the basis of the likewise aforementioned input local oscillator frequency $f_{LO\ I}$ using the following formula:

$$f_{LOn} = f_{LO\ I}\left(1 + \frac{2 \cdot v_{obj\ n}}{c_0}\right), \tag{1}$$

where $v_{obj\ n}$ is the speed of the simulated radar target using the n-th output signal relative to the radar system, while $c_0$ represents the propagation speed of the applicable electromagnetic wave in open space.

As already revealed above, FIG. 5 shows an applicable two-stage conversion. After a signal transmitted by the radar system has been received using a receive antenna 501 and subsequently amplified by means of an amplifier 502, the applicable signal is mixed with a particular local oscillator frequency by means of an input-side mixer 503 before the accordingly mixed signal is supplied to a multirate system 504 comprising both an input channel 505 and n output channels 506.

After each of the n signals, after passing through the multirate system 504, has additionally been filtered using an appropriate filter 507 and amplified by means of a variable amplifier 508 in the respective output channel, it is passed in each case to two parallel mixers 509 that mix the applicable signal with a particular mix frequency in each case. The output signals of the applicable mixer pair 509 of the respective output channel are subsequently added to produce a corresponding quadrature signal.

Further, the applicable quadrature signals are in particular added to produce an aggregate signal that is mixed with the aforementioned particular local oscillator frequency using an output-side mixer 510. Subsequently, the signal obtained during this mixing is amplified by means of an amplifier 511 and returned to the applicable radar system using a transmitter antenna 512.

The calculation of the particular mix frequency of the n-th output channel $f_{Mix\ n}$ can take place on the basis of the particular local oscillator frequency $f_{LO}$ using the following formula:

$$f_{Mix\,n} = f_{LO} \frac{2 \cdot v_{obj\,n}}{c_0}, \qquad (2)$$

where $v_{obj\ n}$ is the speed of the simulated radar target using the n-th output channel relative to the radar system, while $c_0$ represents the propagation speed of the applicable electromagnetic wave in open space.

Figure 6:
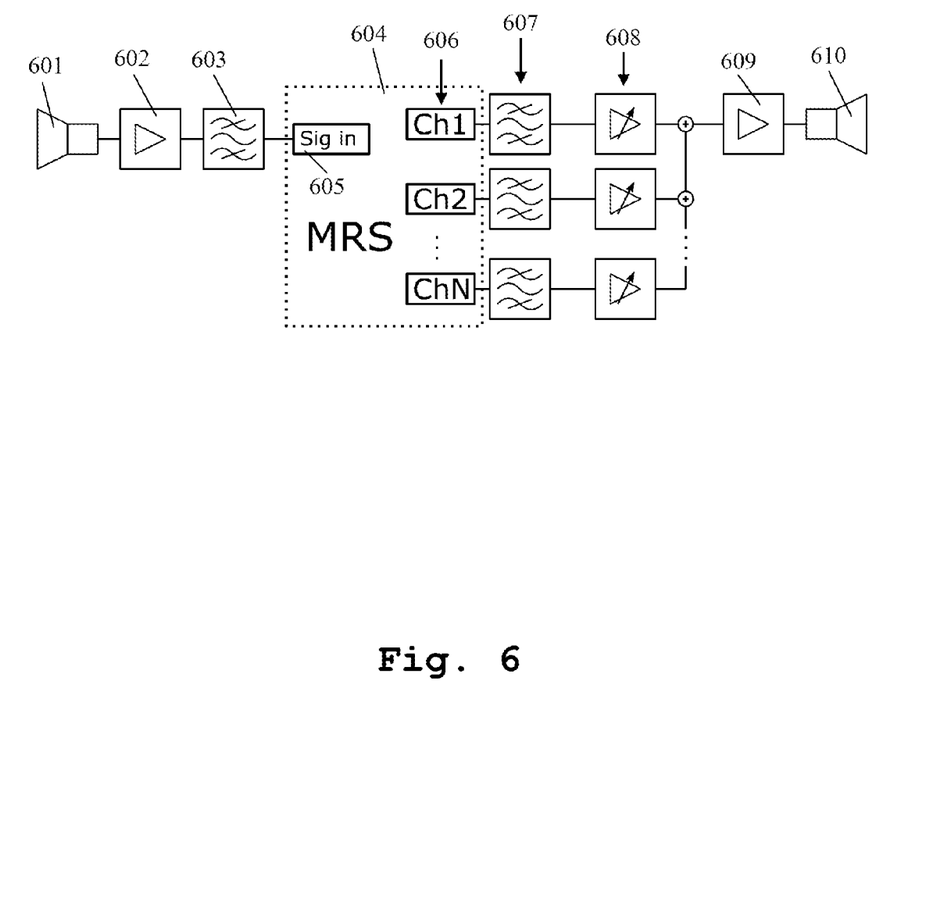
FIG. 6 shows a sixth exemplary embodiment of a radar target simulator according to the invention.

Further, FIG. 6 shows the sixth embodiment of a radar target simulator according to the invention. This has a receive antenna, in particular a horn antenna 601. The receive antenna 601 is configured to receive a signal transmitted by a radar system as an input signal. The output of the receive antenna 601 is connected to the input of an amplifier 602, which is configured to amplify the applicable signal applied to the input thereof. The output of the amplifier 602 is connected to the input of a filter, in particular a bandpass filter 603, which is configured to filter the applicable signal.

Further, the sixth embodiment has a multirate system 604 comprising an input channel 605 and n output channels 606. The output of the aforementioned filter 603 is connected to the input of the multirate system 604. Furthermore, each output of the n output channels 606 of the multirate system 604 is respectively connected to the input of an appropriate filter, in particular a bandpass filter. Each of these n filters 607 is configured to filter the respective output signal of the multirate system 604. The output of each of the n filters 607 is connected to the input of a respective amplifier, in particular a variable or adjustable amplifier. Each of the n amplifiers 608 is configured to amplify the applicable signal. In addition, all the outputs of the n amplifiers 608 are added using appropriate adding nodes, which leads to an aggregate signal. This aggregate signal is passed to the input of an amplifier 609 configured to amplify the aggregate signal. Also, the sixth embodiment has a transmit antenna 610 configured to return the amplified aggregate signal for radar target simulation to the applicable radar system.

Advantageously, it can be stated in regard to the sixth embodiment that alias products or spectral ambiguities that arise during sampling processes can be exploited so as not to have to perform a mixing process. This requires the signal on the carrier frequency to be limited using the bandpass filter 603 to the bandwidth that is used. It can then be sampled using an analogue-to-digital converter, which is in particular part of the multirate system 604. It can then be processed further using the multirate system 604. The output results in a digital-to-analogue converter or n digital-to-analogue converters (one for each of the n output channels), with a high bandwidth up to the high-frequency signal in each case, being chosen that also generates alias components on the carrier frequency. The bandpass filter 607, as a reconstruction filter, is used to reject the other, unwanted aliases. This makes use of the fact that changing the sampling rate also shifts the alias frequencies, specifically equally to the Doppler shift for a genuine target. Multiple independent targets can likewise be produced via the different channels using addition. The attenuation can take place both in the analogue domain, as depicted according to FIG. 6, or in the digital domain.

Figure 7:
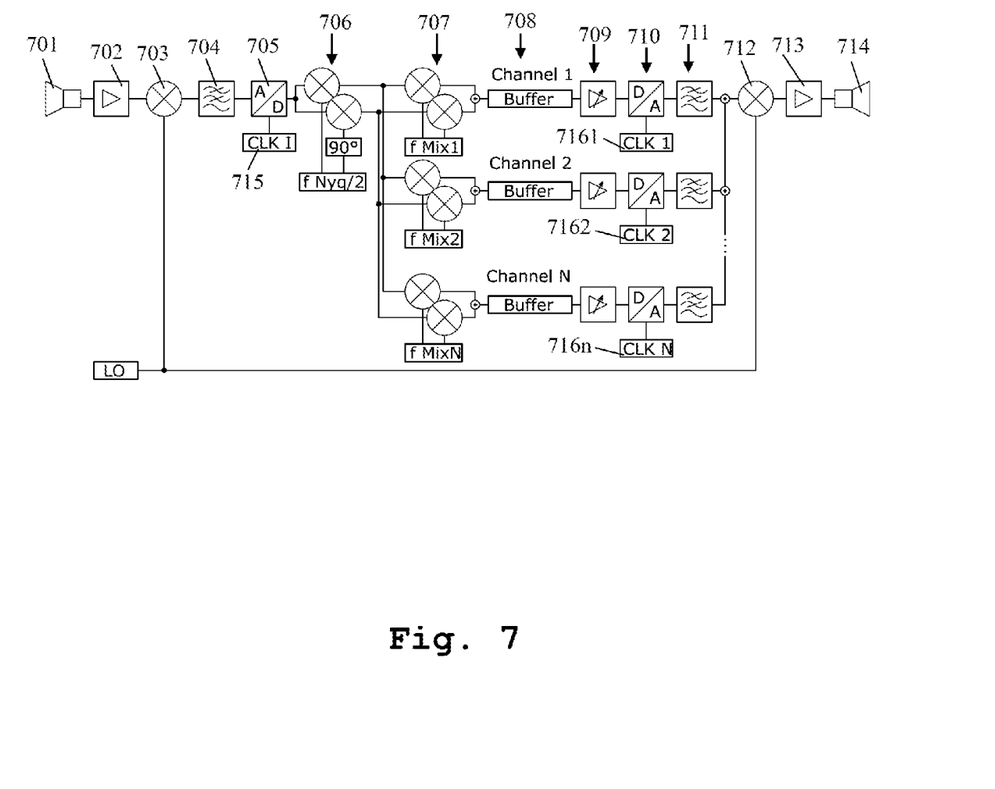
FIG. 7 shows a seventh exemplary embodiment of a radar target simulator according to the invention.

The seventh embodiment according to FIG. 7, by contrast, shows an attenuation in the digital domain and a mixing for an applicable Doppler shift.

This seventh embodiment has a receive antenna 701 for receiving a radar signal transmitted by a radar system and a downstream amplifier 702 for amplifying the applicable signal. The amplified signal is subsequently mixed with a particular local oscillator frequency using an input-side mixer 703. Before the resultant signal is supplied to an analogue-to-digital converter 705 having a first clock generator 715, it is filtered using a filter 704.

The applicable digital signal after the analogue-to-digital conversion is then supplied to a complex mixer pair 706. In this case, the digital signal is mixed with half of the applicable Nyquist frequency in a first path, while the digital signal is likewise mixed with half of the applicable Nyquist frequency in a second path, which is in particular parallel to the first path, wherein additionally a phase shift of 90 degrees is performed.

Subsequently, the signal thus obtained is mixed, using n additional mixer pairs 706 both in the first and in the second path, with in each case a particular mix frequency for the respective applicable output channel from a total of n output channels. The respective aggregate signal of the first and the second path is then supplied to the appropriate one of a total of n memories, in particular n buffer memories 708, each of the n output channels.

Before the data from the applicable one of the n memories 708 for each output channel are respectively converted using the applicable one of n digital-to-analogue converters 710 having a respective applicable second clock generator 7161, 7162, . . . , 716n, amplification is effected using an applicable one of a total of n variable or adjustable amplifiers 709.

After the digital-to-analogue conversion, the applicable analogue signal is filtered in the respective output channel by means of the applicable one of a total of n filters 711. Subsequently, all the outputs of the n filters 711 are added using appropriate adding nodes to produce an aggregate signal.

The aggregate signal thus obtained is then mixed with the aforementioned particular local oscillator frequency using an output-side mixer 712, subsequently amplified by means of an amplifier 713 and returned to the applicable radar system for radar target simulation using a transport antenna 714.

Figure 8:
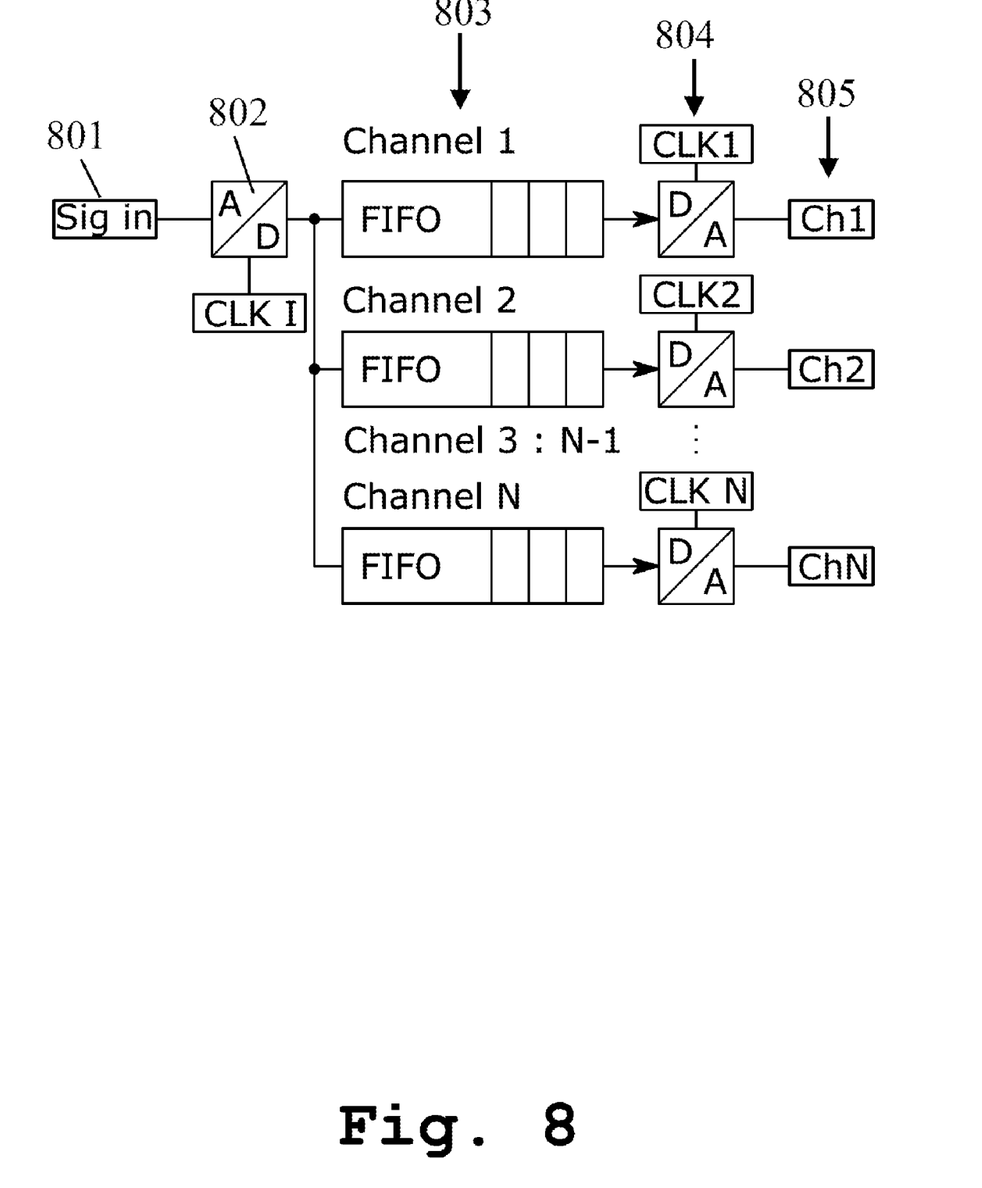
FIG. 8 shows an eighth exemplary embodiment of a radar target simulator according to the invention.

Advantageously, the seventh embodiment according to FIG. 7 provides the option of performing a manipulation of the signals directly in the memory. This option fundamentally requires complex mixing in order in particular to reject intermediate frequencies and to achieve a positive or negative shift. The whole signal path (in particular between up-conversion and down-conversion) or else portions thereof can be embodied in complex fashion in this case. The memory or buffer memory used can be realised as an FIFO (First In-First Out) as depicted in FIG. 8, as a ring buffer (see FIG. 9) or on the basis of a SerDes (Serialiser/Deserialiser) according to FIG. 10. The manipulation of the data (mixing and attenuation) can take place both upstream and downstream of the storage.

The calculation of the particular mix frequency of the n-th output channel $f_{Mix\ n}$ can take place on the basis of the particular local oscillator frequency $f_{LO}$ using the following formula:

$$f_{Mix\,n} = \frac{f_{LO}}{\left(1 + \frac{c_0}{2 \cdot v_{obj\,n}}\right)} \approx f_{LO}\left(\frac{2 \cdot v_{obj\,n}}{c_0}\right), \quad (3)$$

where $v_{obj\,n}$ is the speed of the simulator radar target using the n-th output channel relative to the radar system, while $c_0$ represents the propagation speed of the applicable electromagnetic wave in open space.

The sampling rates behave in the same way as those of formula (4), which is presented below.

Within this context, it should once again fundamentally be stated that an analogue-to-digital converter, for example the analogue-to-digital converter 705, samples the applicable signal. This takes place at a sampling rate that is prescribed by the first clock generator 715, for example, and that in particular can map the full bandwidth of the transmitting radar system. The signal is stored in a memory, in particular a buffer memory. To this end, the aforementioned FIFO buffer memory or else the likewise aforementioned ring buffer, for example, is suitable. A digital-to-analogue converter or, according to the number of output channels, multiple digital-to-analogue converters, for example the n digital-to-analogue converters, is/are used to output the signal, but at a different sampling rate from when reading in. This sampling rate is prescribed for example by the applicable one of the n second clock generators 7161, 7162, ..., 716n for the respective output channel. A reconstruction filer is used to reject the undesirable frequencies of the signal that arise during digital-to-analogue conversion.

The sampling rate $f_{CLKn}$ of the digital-to-analogue converter of the n-th output channel relative to the sampling rate $f_{CLK\,I}$ of the analogue-to-digital converter can be calculated using the following formula:

$$f_{CLKn} = f_{CLK\,I} \cdot \frac{1}{1 + \frac{2 \cdot v_{obj\,n}}{c_0}}, \quad (4)$$

where $v_{obj\,n}$ is the speed of the simulated radar target using the n-th output channel relative to the radar system, while $c_0$ represents the propagation speed of the applicable electromagnetic wave in open space.

In this case, the analogue-to-digital converter is in particular operated at a fixed sampling rate ($f_{CLK\,I}$). The recorded radar test signal is buffer-stored in a memory in time-coherent fashion. The position of the target is determined using the time delay between the input and output of the data of the memory. To vary this, a different sampling rate ($f_{CLKn}$) is used for the output than for reading in the data ($f_{CLK\,I}$). If the rate for outputting is higher than that for reading in the data, the memory is emptied. The samples are output with compressed timing. This simulates a target that is approaching the radar platform and, from the signal duration, corresponds to a real target.

If the sampling rate is lower on the output side, on the other hand, then the memory is filled. The output with expanded timing simulates a target that is moving away from the radar platform. The initial distance of the target is reached by a propagation delay in the recorded signal in the memory, for example by filling voids. The maximum simulable distance is limited for this technique only by the length of the memory and the sampling rate. An adjustable amplifier (analogue or digital) upstream of the output can additionally be used to simulate the transmitted power and hence a backscatter cross section of the target.

If more than one target is to be simulated, this can take place using a further channel, in particular a further output channel, which is added to the others. The data for this can be stored in a further memory or read at another location in the same memory. Interpolation for rejecting alias frequencies is effected using the various reconstruction filters downstream of the digital-to-analogue conversion.

As already indicated above, various embodiments in particular relating to the memory realisation are depicted below.

FIG. 8 shows the eighth embodiment, in which the memory has been embodied as a FIFO buffer. This eighth embodiment has an input channel 801 and an output channel 805. The signal of the input channel 801 is digitized using an analogue-to-digital converter 802 having a first clock generator, which prescribes the sampling frequency of the analogue-to-digital converter 802.

Subsequently, the applicable digital signal can be written to the applicable FIFO memory or FIFO buffer memory from a total of n FIFO memories 803 of the respective output channel of the total of n output channels 805.

Furthermore, the applicable FIFO memory in each of the n output channels 805 is read using the applicable one of a total of n digital-to-analogue converters 804 and a corresponding analogue signal is generated. Each of the n digital-to-analogue converters 804 additionally has an applicable one of a total of n second clock generators, each of which prescribes the timing for the applicable digital-to-analogue conversion in a respective one of the n output channels 805.

For the relationship between the sampling rate $f_{CLKn}$ of the digital-to-analogue converter of the n-th output channel and the sampling rate $f_{CLK\,I}$ of the analogue-to-digital converter, formula (4) above holds.

It should be pointed out that the parallel FIFO memories scale very well for greater distances and many radar targets at the expense of higher memory outlay as a result of redundant data storage. The outlay can be reduced, however, if the technology used for implementation supports memories having more than two interfaces.

Figure 9:
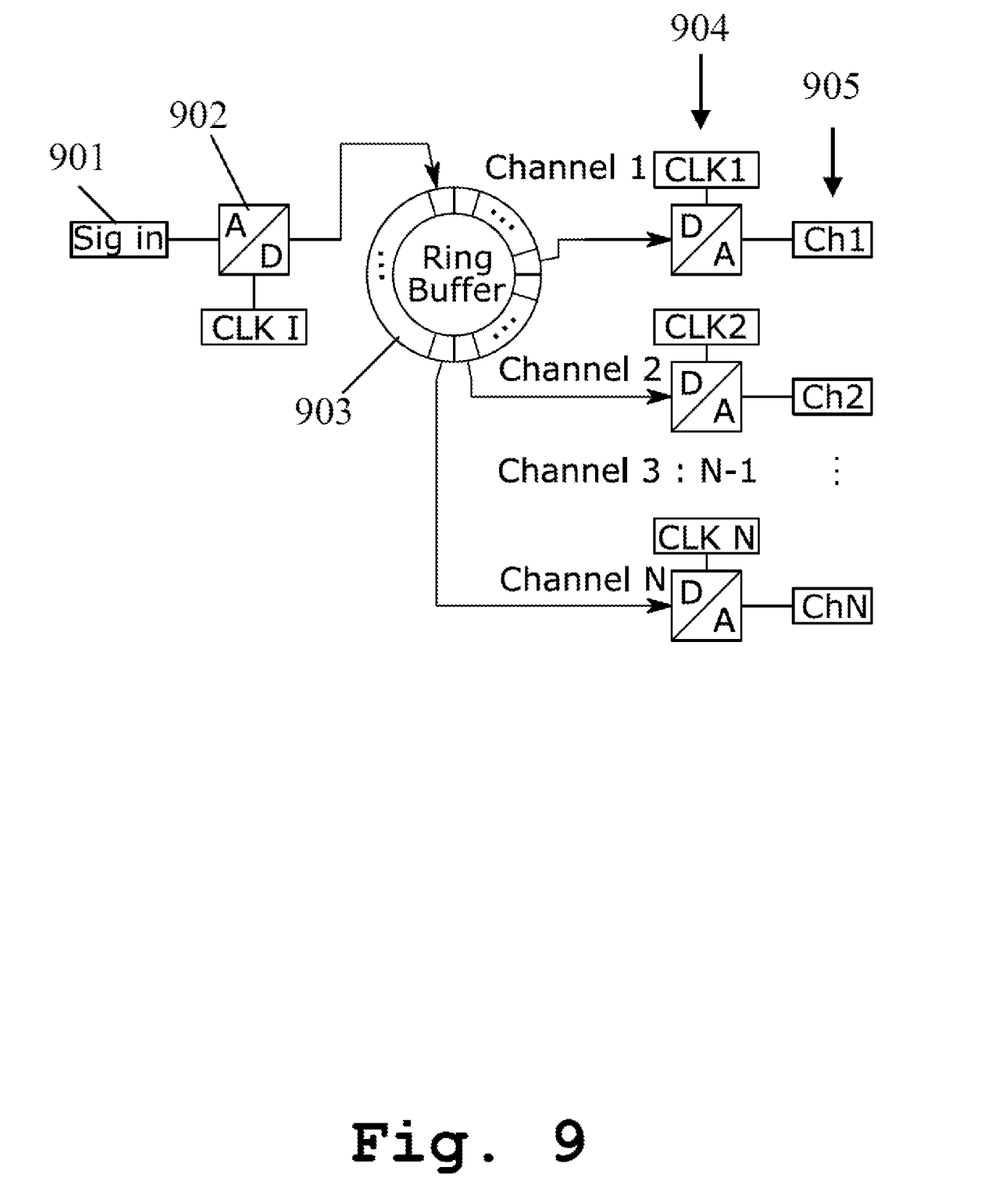
FIG. 9 shows a ninth exemplary embodiment of a radar target simulator according to the invention.

FIG. 9 illustrates the ninth embodiment, in which the memory has been embodied as a ring buffer 903. This ninth embodiment has an input channel 901 and n output channels 905. The signal of the input channel 901 is digitized using an analogue-to-digital converter 902 having a first clock generator, which prescribes the sampling frequency of the analogue-to-digital converter 902.

Subsequently, the applicable digital signal is written to the applicable ring memory or ring buffer memory.

Furthermore, the ring memory 903 in each of the n output channels 905 is read as appropriate using the applicable one of a total of n digital-to-analogue converters 904, and a corresponding analogue signal is generated. Each of the n digital-to-analogue converters 904 additionally has an applicable one of a total of n second clock generators, each of which prescribes the timing for the applicable digital-to-analogue conversion in the respective one of the n output channels 905.

For the relationship between the sampling rate $f_{CLKn}$ of the digital-to-analogue converter of the n-th output channel and the sampling rate $f_{CLK\,I}$ of the analogue-to-digital converter, formula (4) above holds.

It should be noted that the ring buffer memory 903 in particular has the advantage that only a central structure is used for the data storage. The memory requirement thus does not rise on account of multiple channels. Each channel, in particular each output channel, preferably needs a pointer to a memory location from which it reads. The bandwidth of the ring buffer should in particular allow the access operations of all the channels.

Figure 10:
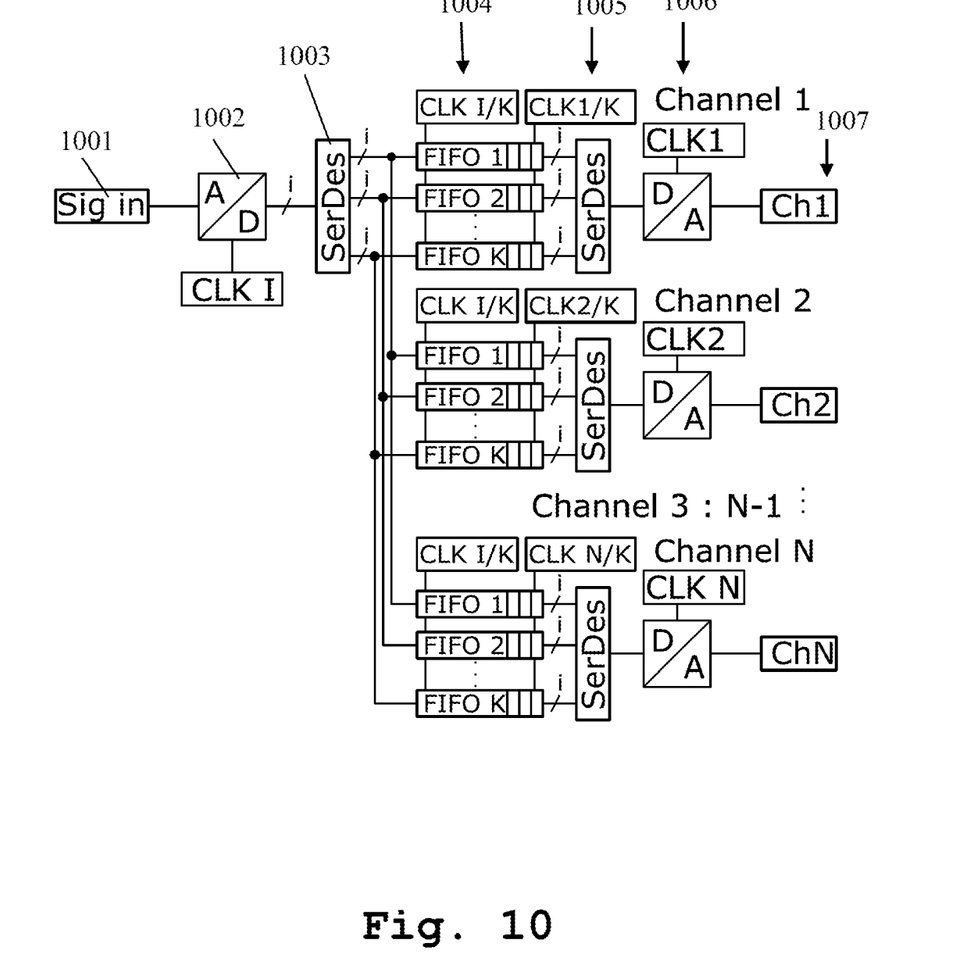
FIG. 10 shows a tenth exemplary embodiment of a radar target simulator according to the invention.

Further, FIG. 10 depicts the tenth embodiment, in which the memory has been realized on an SerDes basis.

This tenth embodiment has an input channel 1001 and n output channels 1007. The signal of the input channel 1001 is digitized using an analogue-to-digital converter 1002 having a first clock generator, which prescribes the sampling frequency of the analogue-to-digital converter 1002.

Subsequently, the applicable digital signal is transferred to a first SerDes unit 1003, which comprises an input path and K output paths.

Furthermore, each of the n output channels 1007 has K FIFO memories, a second SerDes unit and a digital-to-analogue converter in each case.

Each of the total of n second SerDes units 1005 further comprises K input paths and an output path. Each of the n digital-to-analogue converters 1006 additionally has an applicable one of a total of n second clock generators, each of which prescribes the timing for the applicable digital-to-analogue conversion in a respective one of the n output channels 1007.

In addition, the applicable signal of each of the K output paths of the first SerDes unit 1003 is written to the applicable one of the K FIFO memories in each of the n output channels 1007. In this case, the applicable write speed is in particular one K-th of the sampling rate $f_{CLK\ I}$ of the analogue-to-digital converter 1002.

Subsequently, the applicable K FIFO memories of the total of n*K FIFO memories 1004 in each of the n output channels 1007 are read using the applicable second SerDes unit of the total of n second SerDes units 1005 before the applicable output signal of the second SerDes unit is converted into a corresponding analogue signal using the applicable digital-to-analogue converter of the total of n digital-to-analogue converters 1006. In this case, the applicable read speed is in particular one K-th of the sampling rate $f_{CLKn}$ of the digital-to-analogue converter of the n-th output channel.

For the relationship between the sampling rate $f_{CLKn}$ of the digital-to-analogue converter of the n-th output channel and the sampling rate $f_{CLK\ I}$ of the analogue-to-digital converter, formula (4) above further holds.

In regard to the tenth embodiment, it should fundamentally be stated that, in particular for high bandwidths, efficient parallelization can be supported. Analogue-to-digital converters and digital-to-analogue converters having high sampling rates often require deserialisers and serialisers in order to convert the datastream at a high clockrate into multiple data streams at a low clock rate, in order to be able to realise the data processing efficiently, for example including in programmable logic. This then involves the use of parallel FIFO memories that are preferably shorter by the parallization factor K but instead are K in number, the input and output clocks of said memories being reduced by the factor K.

Figure 11:
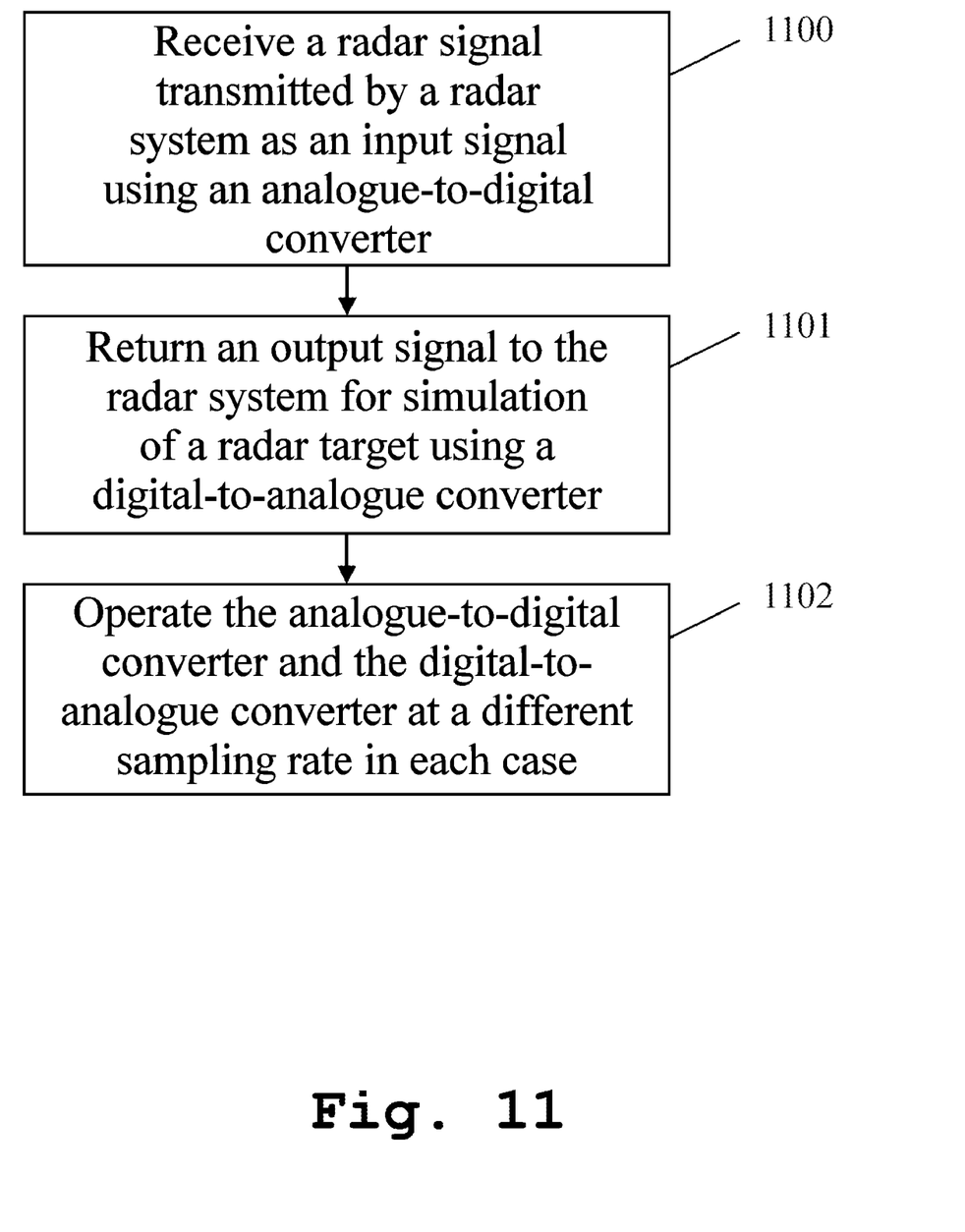
FIG. 11 shows an exemplary flowchart of an embodiment of the method according to the invention for radar target simulation.

Finally, FIG. 11 shows an exemplary flowchart for the method according to the invention for radar target simulation. In a first step 1100, a radar signal transmitted by a radar system is received as an input signal using an analogue-to-digital converter. According to a second step 1101, an output signal is then returned to the radar system for simulation of a radar target using a digital-to-analogue converter. Subsequently, in a third step 1102, the analogue-to-digital converter and the digital-to-analogue converter are operated at a different sampling rate in each case.

The invention is not restricted to the exemplary embodiments discussed above. Instead of a GPS signal, it is also possible for another time-characterizing signal to be used that, by way of example, is emitted in the mobile radio system for time synchronization. It is also possible for another satellite-assisted system, for example the NNSS system or the SBAS system, to be used. All the features described in the description or features claimed in the patent claims or features shown in the drawings are arbitrarily combinable with one another within the context of this invention.

What is claimed is:

1. A radar target simulator having an analogue-to-digital converter having a first clock generator and a digital-to-analogue converter having a second clock generator,
    wherein the analogue-to-digital converter is configured to receive a radar signal transmitted by a radar system as an input signal,
    wherein the digital-to-analogue converter is configured to return an output signal to the radar system for simulation of a radar target,
    wherein the first and the second clock generator are configured to operate the analogue-to-digital converter and the digital-to-analogue converter at a different sampling rate in each case, and
    wherein the radar target simulator is configured to simulate the radar target based on an undersampling of the input signal.

2. The radar target simulator according to claim 1,
    wherein the radar target simulator has a memory,
    wherein applicable samples of the analogue-to-digital converter relating to the input signal are written to the memory at a write speed that differs from the read speed at which applicable values of the digital-to-analogue converter relating to the formation of the output signal are read from the memory.

3. The radar target simulator according to claim 1,
    wherein the radar target simulator has at least one further digital-to-analogue converter in order to provide at least two output channels, and/or wherein the radar target simulator has at least one further analogue-to-digital converter in order to provide at least two input channels.

4. The radar target simulator according to claim 1,
    wherein for the relationship between the sampling rate of the digital-to-analogue converter $f_{CLKn}$, where n=1, and the sampling rate of the analogue-to-digital converter $f_{CLK\ I}$, or, when there are multiple output channels, for the relationship between the sampling rate of the applicable digital-to-analogue converter $f_{CLKn}$, where n=1, 2, 3, . . . , in the respective output channel and the sampling rate of the analogue-to-digital converter $f_{CLK\ I}$, it holds that:

$$f_{CLKn} = f_{CLK\ I} \cdot \frac{1}{1 + \frac{2 \cdot v_{obj\ n}}{c_0}},$$

where $v_{obj\ n}$ is the speed of the accordingly simulated radar target using the one or the respective output channel relative to the radar system, and
where $c_0$ is the propagation speed of the applicable electromagnetic wave in open space.

5. The radar target simulator according to claim 1,
wherein the radar target simulator is configured to process the input signal on the applicable carrier signal frequency.

6. The radar target simulator according to claim 1,
wherein the radar target simulator is configured to process the input signal on an intermediate frequency level,
wherein the radar target simulator has an input-side mixer configured to mix the input signal with a first frequency before the conversion using the analogue-to-digital converter,
wherein the radar target simulator has an output-side mixer, or, when there are multiple output channels, accordingly multiple output-side mixers, which are each configured to mix the output signal in each case with a second frequency, or, when there are multiple output channels, with an applicable second frequencies in the respective output channel, after the conversion using the applicable digital-to-analogue converter.

7. The radar target simulator according to claim 6,
wherein for the relationship between the first frequency $f_{LO\ I}$ and the second frequency $f_{LO\ n}$, where n=1, or, when there are multiple output channels, for the relationship between the first frequency $f_{LO\ I}$ and the applicable second frequency $f_{LO\ n}$, where n=1, 2, 3, . . . , in the respective output channel, it holds that:

$$f_{LO\,n} = f_{LO\,I}\left(1 + \frac{2 \cdot v_{obj\,n}}{c_0}\right),$$

where $v_{obj\ n}$ is the speed of the accordingly simulated radar target using the one or the respective output channel relative to the radar system, and
where $c_0$ is the propagation speed of the applicable electromagnetic wave in open space.

8. The radar target simulator according to claim 1,
wherein the radar target simulator has an input-side mixer configured to mix the input signal with a local oscillator frequency before the conversion using the analogue-to-digital converter,
wherein the radar target simulator has an output-side mixer configured to mix the output signal with the local oscillator frequency, or, when there are multiple output channels, to mix each of these output channels with the local oscillator frequency, after the conversion using the digital-to-analogue converter,
wherein the radar target simulator has an additional mixer, or, when there are multiple output channels, accordingly multiple additional mixers, which are each configured to mix the input signal with a mix frequency, or, when there are multiple output channels, with an applicable mix frequency in the respective output channel, after the conversion using the analogue-to-digital converter.

9. The radar target simulator according to claim 8,
wherein for the relationship between the local oscillator frequency $f_{LO}$ and the mix frequency $f_{Mix\,n}$, where n=1, or, when there are multiple output channels, for the relationship between the local oscillator frequency $f_{LO}$ and the applicable mix frequency $f_{Mix\,n}$, where n=1, 2, 3, . . . , in the respective output channel, it holds that:

$$f_{Mix\,n} = \frac{f_{LO}}{\left(1 + \frac{c_0}{2 \cdot v_{obj\,n}}\right)} \approx f_{LO}\left(\frac{2 \cdot v_{obj\,n}}{c_0}\right),$$

where $v_{obj\ n}$ is the speed of the accordingly simulated radar target using the one or the respective output channel relative to the radar system, and
where $c_0$ is the propagation speed of the applicable electromagnetic wave in open space.

10. A method for radar target simulation using a radar target simulator having an analogue-to-digital converter having a first clock generator and a digital-to-analogue converter having a second clock generator, wherein the method comprises:
receiving a radar signal transmitted by a radar system as an input signal using the analogue-to-digital converter,
returning an output signal to the radar system for simulation of a radar target using the digital-to-analogue converter, and
operating the analogue-to-digital converter and the digital-to-analogue converter at a different sampling rate in each case,
wherein the radar target simulator is configured to simulate the radar target based on an undersampling of the input signal.

11. The method according to claim 10,
wherein for the relationship between the sampling rate of the digital-to-analogue converter $f_{CLKn}$, where n=1, and the sampling rate of the analogue-to-digital converter $f_{CLK\,I}$, or, when there are multiple output channels, for the relationship between the sampling rate of the applicable digital-to-analogue converter $f_{CLKn}$, where n=1, 2, 3, . . . , in the respective output channel and the sampling rate of the analogue-to-digital converter $f_{CLK\,I}$, it holds that:

$$f_{CLKn} = f_{CLK\,I} \cdot \frac{1}{1 + \frac{2 \cdot v_{obj\,n}}{c_0}},$$

where $v_{obj\ n}$ is the speed of the accordingly simulated radar target using the one or the respective output channel relative to the radar system, and
where $c_0$ is the propagation speed of the applicable electromagnetic wave in open space.

* * * * *